(12) United States Patent
Funaki et al.

(10) Patent No.: US 7,855,259 B2
(45) Date of Patent: *Dec. 21, 2010

(54) METHOD FOR PRODUCING MELT-PROCESSABLE FLUORORESIN

(75) Inventors: Atsushi Funaki, Tokyo (JP); Hiroki Kamiya, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/104,788

(22) Filed: Apr. 17, 2008

(65) Prior Publication Data

US 2008/0200627 A1    Aug. 21, 2008

Related U.S. Application Data

(63) Continuation of application No. PCT/JP2006/320654, filed on Oct. 17, 2006.

(30) Foreign Application Priority Data

Oct. 20, 2005    (JP) .............................. 2005-305659

(51) Int. Cl.
*C08F 16/24* (2006.01)
(52) U.S. Cl. ................. 526/247; 524/545; 524/546; 524/777; 526/209; 526/214; 526/244; 526/249; 526/250
(58) Field of Classification Search ................. 526/247, 526/209, 214; 524/777
See application file for complete search history.

(56) References Cited

U.S. PATENT DOCUMENTS

| 2003/0181572 A1* | 9/2003 | Tan et al. ................. 524/502 |
| 2004/0186219 A1 | 9/2004 | Dadalas et al. |
| 2005/0043471 A1* | 2/2005 | Epsch et al. ................. 524/544 |
| 2007/0015864 A1 | 1/2007 | Hintzer et al. |
| 2007/0025902 A1 | 2/2007 | Hintzer et al. |
| 2007/0027251 A1 | 2/2007 | Hintzer et al. |
| 2008/0015304 A1 | 1/2008 | Hintzer et al. |
| 2008/0114122 A1 | 5/2008 | Brothers et al. |

FOREIGN PATENT DOCUMENTS

| EP | 0219065 B2 * | 4/1987 |
| EP | 1698662 A | 9/2006 |
| JP | 39-24263 | 10/1964 |
| JP | 57-70112 | 4/1982 |
| JP | 57070112 | 4/1982 |
| JP | 2002-308913 | 10/2002 |
| JP | 2002-317003 | 10/2002 |
| JP | 2003-119204 | 4/2003 |
| WO | 00/71590 | 11/2000 |
| WO | WO 00/71590 | 11/2000 |
| WO | WO 2005/042593 | 5/2005 |

OTHER PUBLICATIONS translation of Tatsu, JP 57-070112, Aug. 2010.*

* cited by examiner

*Primary Examiner*—David Wu
*Assistant Examiner*—Nicole M Buie-Hatcher
(74) *Attorney, Agent, or Firm*—Oblon, Spivak, McClelland, Maier & Neustadt, L.L.P.

(57) ABSTRACT

To provide a method for producing a melt-processable fluororesin, which is capable of increasing the molecular weight of the fluororesin and preventing coloration of the fluororesin, by using a specific fluorinated emulsifier other than ammonium perfluorooctanoate. A method for producing a melt-processable fluororesin which is characterized in that a fluorinated monomer is emulsion-polymerized in an aqueous medium containing a fluorinated emulsifier of a formula (I)

$XCF_2CF_2(O)_mCF_2CF_2OCF_2COOA$ wherein X is a hydrogen atom or a fluorine atom, A is a hydrogen atom, an alkali metal or $NH_4$, and m is an integer of 0 or 1.

5 Claims, No Drawings

METHOD FOR PRODUCING MELT-PROCESSABLE FLUORORESIN

TECHNICAL FIELD

The present invention relates to a method for producing a melt-processable fluororesin by using a specific fluorinated emulsifier.

BACKGROUND ART

For the production of a melt-processable fluororesin by emulsion polymerization, ammonium perfluorooctanoate (hereinafter referred to as APFO) is widely used as an emulsifier.

However, with APFO, its bioaccumulation potential has been pointed out, and there has been a concern expressed about environmental problems with respect to disposal of APFO. A substitute emulsifier for APFO is therefore demanded.

Therefore, a method for producing the melt-processable fluororesin by using various emulsifiers other than APFO has been proposed, wherein a fluorinated monomer alone or a fluorinated monomer and another monomer are copolymerized in an aqueous medium (for example, Patent Documents 1 and 2).

With the emulsion-polymerization method in Patent Document 1, its applicability for the production of a melt-processable fluororesin was not necessarily high, because the molecular weight of an obtainable fluororesin tended to be low, or the fluororesin had coloration.

In an Example in Patent Document 2, use of $CF_3CF_2OCF_2CF_2OCF_2COONH_4$ as a polymerization emulsifier for producing polytetrafluoroethylene modified by a trace amount of hexafluoropropylene, is disclosed, but an application for a melt-processable fluororesin is not described.

In an Example in Patent Document 3, $CF_3CF_2OCF(CF_3)CF_2OCF(CF_3)COONH_4$ as a polymerization emulsifier is disclosed, but it was found that the emulsifier had a higher bioaccumulation potential than APFO.

In Examples in Patent Document 4, $F(CF_2)_5OCF(CF_3)COONH_4$, etc. are disclosed.

Patent Document 1: JP-A-2002-308913
Patent Document 2: JP-B-39-24263
Patent Document 3: JP-A-2003-119204
Patent Document 4: JP-A-2002-317003

DISCLOSURE OF THE INVENTION

Object to be Accomplished by the Invention

An object of the present invention is to provide a method for producing a melt-processable fluororesin, which is capable of increasing the molecular weight of the fluororesin and preventing coloration of the fluororesin, by using a specific fluorinated emulsifier other than ammonium perfluorooctanoate.

Means to Accomplish the Object

The present inventors have conducted extensive studies to accomplish the above object, and as a result, they have found it possible to accomplish the object by emulsion polymerizing a fluorinated monomer by using a specific fluorinated emulsifier of a formula (1). The present invention has been accomplished on the basis of this discovery.

Namely, the present invention provides the following:

1. A method for producing a melt-processable fluororesin, which is characterized in that a fluorinated monomer is emulsion-polymerized in an aqueous medium containing a fluorinated emulsifier of a formula (1)

wherein X is a hydrogen atom or a fluorine atom, A is a hydrogen atom, an alkali metal or $NH_4$, and m is an integer of 0 or 1.

2. The method for producing a melt-processable fluororesin according to the above 1, wherein the above fluorinated monomer is at least one member selected from the group consisting of tetrafluoroethylene, vinylidene fluoride, hexafluoropropylene, a perfluoro(alkyl vinyl ether) of $CF_2=CFOR_f$ wherein $R_f$ is a $C_{1-16}$ perfluoroalykyl group which may contain an etheric oxygen atom, chlorotrifluoroethylene, a polyfluoroalkyl ethylene, perfluoro(2,2-dimethyl-1,3-dioxole), a perfluoro(4-alkyl-1,3-dioxole) and $CF_2=CFO(CF_2)_nCF=CF_2$ wherein n is 1 or 2.

3. The method for producing a melt-processable fluororesin according to the above 1, wherein the above melt-processable fluororesin is a copolymer of ethylene and at least one fluorinated monomer selected from the group consisting of tetrafluoroethylene, vinylidene fluoride, hexafluoropropylene and chlorotrifluoroethylene.

4. The method for producing a melt-processable fluororesin according to the above 1, wherein the above melt-processable fluororesin is a tetrafluoroethylene/perfluoro (alkyl vinyl ether) copolymer, a tetrafluoroethylene/hexafluoropropylene copolymer, a tetrafluoroethylene/ethylene copolymer, a tetrafluoroethylene/hexafluoropropylene/vinylidene fluoride copolymer, a tetrafluoroethylene/hexafluoropropylene/ethylene copolymer, a tetrafluoroethylene/hexafluoropropylene/perfluoro (alkyl vinyl ether) copolymer, a polyvinylidene fluoride or a chlorotrifluoroethylene/ethylene copolymer.

5. The method for producing the melt-processable fluororesin according to any one of the above 1 to 4, wherein the content of the fluorinated emulsifier is from 0.01 to 10 mass %, based on the aqueous medium.

6. The method for producing the melt-processable fluororesin according to any one of the above 1 to 4, wherein the fluorinated emulsifier of the above formula (1) is $CF_3CF_2OCF_2CF_2OCF_2COONH_4$.

EFFECTS OF THE INVENTION

According to the production method of the present invention, it is possible to produce a melt-processable fluororesin having a high molecular weight, without using APFO which may bring about adverse effects to the environment. Further, the fluorinated emulsifier adhered to the obtained fluororesin can be easily removed by washing with water, and when the obtained fluororesin is molded into an article, it is possible to prevent coloration.

BEST MODE FOR CARRYING OUT THE INVENTION

The fluorinated emulsifier used in the present invention is the fluorinated emulsifier of the formula (1).

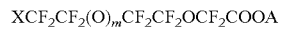 Formula (1)

wherein X is a hydrogen atom or a fluorine atom, A is a hydrogen atom, an alkali metal or $NH_4$, and m is an integer of 0 or 1.

In the formula (1), X is preferably a fluorine atom from the viewpoint of polymerization stability. Further, the value for m is preferably 1 from the viewpoint of polymerization stability and mechanical stability of an aqueous PTFE emulsion.

A may, for example, be H, Li, Na, K or $NH_4$. However, $NH_4$ is particularly preferred because it has good solubility in water, and no metal ion component will remain in the fluororesin as an impurity.

Among the fluorinated emulsifiers of the formula (1), particularly preferred is e.g. $CF_3CF_2CF_2CF_2OCF_2COONH_4$ or $CF_3CF_2OCF_2CF_2OCF_2COONH_4$ (hereinafter referred to as EEA), and EEA is more preferred.

The fluorinated emulsifier of the formula (1) may be obtained by a known fluorination method such as a liquid phase fluorination method wherein the corresponding non-fluorinated carboxylic acid or an ester of a partly fluorinated carboxylic acid, is used and reacted with fluorine in a liquid phase, a fluorination method using cobalt fluoride, or an electrochemical fluorination method, and the obtained fluorinated ester bond is hydrolyzed, followed by purification and then by neutralization with ammonia.

In the production method of the present invention, it is possible to obtain an aqueous emulsion of the melt-processable fluororesin by emulsion-polymerizing a fluorinated monomer in an aqueous medium containing the above fluorinated emulsifier.

The content of the fluorinated emulsifier of the formula (1) in the aqueous medium is preferably from 0.01 to 10.0 mass %, more preferably from 0.1 to 5 mass %, most preferably from 0.2 to 3 mass %.

The aqueous medium may, for example, be deionized water, pure water or ultrapure water. The aqueous medium may contain a soluble organic solvent. The organic solvent may, for example, be an alcohol, a ketone, an ether, an ethylene glycol or a propylene glycol. The content of the organic solvent is preferably from 1 to 50 parts by mass, more preferably from 3 to 20 parts by mass, based on 100 parts by mass of water. Further, the amount of the aqueous medium, which is the base for the content of the fluorinated emulsifier, does not include the contents of other additives such as a polymerization initiator.

The fluorinated monomer used in the present invention is preferably at least one member selected from the group consisting of tetrafluoroethylene, vinylidene fluoride, hexafluoropropylene, a perfluoro(alkyl vinyl ether) of $CF_2=CFOR_f$ wherein $R_f$ is a $C_{1-16}$ perfluoroalkyl group which may contain an etheric oxygen atom, chlorotrifluoroethylene, a polyfluoroalkyl ethylene, perfluoro(2,2-dimethyl-1,3-dioxole), a perfluoro(4-alkyl-1,3-dioxole) and $CF_2=CFO(CF_2)_n CF=CF_2$ wherein n is 1 or 2.

$R_f$ is preferably a $C_{1-16}$ perfluoroalkyl group which may contain an etheric oxygen atom, more preferably a $C_{1-8}$ perfluoroalkyl group. The perfluoroalkyl group may be linear, branched or cyclic. The specific example may, for example, be $CF_3$, $CF_2CF_5$, $CF_3CF_2CF_2$, $(CF_3)_2CFCF_2CF_2$, $CF_3CF_2OCF_2CF_2$ or $CF_3CF_2CF_2OCF(CF_3)CF_2$.

In the present invention, it is also preferred to further copolymerize an olefin such as ethylene, propylene or butene, in addition to the above fluorinated monomer.

As the olefin, ethylene is preferred. The olefin is preferably copolymerized with at least one member selected from the group consisting of tetrafluoroethylene, vinylidene fluoride, hexafluoropropylene and chlorotrifluoroethylene, more preferably copolymerized with at least one member selected from the group consisting of tetrafluoroethylene and chlorotrifluoroethylene.

The amount of total monomers used is preferably from 1 to 100 mass %, more preferably from 10 to 80 mass %, based on the amount of the aqueous medium.

As the polymerization initiator to be used in the emulsion-polymerization, a conventional radical polymerization initiator may be used, and a water-soluble polymerization initiator is particularly preferred. The water-soluble polymerization initiator may, for example, be a persulfate such as ammonium persulfate, hydrogen peroxide, a redox polymerization initiator made by combination thereof with a reducing agent such as sodium hydrogensulfite or sodium thiosulfate, an inorganic polymerization initiator of a system wherein a small amount of iron, a ferrous salt (such as ferrous sulfate), silver sulfate or the like is coexistent therewith, or an organic polymerization initiator such as disuccinic acid peroxide or azobisisobutylamidine dihydrochloride.

The polymerization initiator may be added at the beginning of the emulsion-polymerization or during the emulsion-polymerization. The amount of the polymerization initiator to be added is preferably from 0.0001 to 3 mass %, particularly preferably from 0.001 to 1 mass %, based on the total mass of the monomers used for the polymerization.

When a redox polymerization initiator is to be employed, it is preferred to use, a pH buffer in order to adjust the pH of the aqueous medium in a range not to deteriorate redox reactivity. As the pH buffer, it is possible to use an inorganic salt such as disodium hydrogenphosphate, sodium dihydrogenphosphate or sodium carbonate. Disodium hydrogenphosphate dihydrate or disodium hydrogenphosphate dodecahydrate is preferred.

Further, as a metal ion which undergoes a redox reaction when the redox polymerization initiator is used, it is possible to use various metals having multiple ionic valences. As a specific example, a transition metal such as iron, copper, manganese or chrome is preferred, and iron is particularly preferred.

Further, in order to let the metal which undergoes a redox reaction, be stably present in the aqueous medium, it is preferred to use a metal chelating agent. As the metal chelating agent, ethylenediamine tetraacetic acid is preferred, and from the viewpoint of the solubility in water, disodium ethylenediamine tetraacetate dihydrate is more preferred.

As a redox reaction reagent when the redox polymerization initiator is used, it is preferred to use a reducing compound. As the reducible compound, various sulfuric sulfur-containing compounds may be used, and Rongalite (chemical formula: $CH_2(OH)SO_2Na.2H_2O$) is particularly preferred.

The reducing compound is preferably added suitably continuously during the polymerization, and it is preferably adjusted to the same pH as the polymerization medium in order not to disturb the pH of the polymerization medium when it is added.

In polymerization of the fluorinated monomer, a chain transfer agent which controls the molecular weight, may be used.

The chain transfer agent may, for example, be an alcohol such as methanol, ethanol or propanol, a chlorofluorohydrocarbon such as 1,3-dichloro-1,1,2,2,3-pentafluoropropane or 1,1-dichloro-1-fluoroethane, or a hydrocarbon such as methane, ethane, propane, butane, pentane, hexane or cyclohexane.

The amount of the chain transfer agent to be added is preferably from 0.001 to 10 mass %, more preferably from 0.01 to 10 mass %, based on the total mass of monomers to be used for the polymerization.

The conditions for the emulsion-polymerization in the present invention are suitably selected depending on the types of monomers to be used, the copolymerization ratio, the decomposition temperature of the polymerization initiator, etc.

The polymerization temperature of the emulsion-polymerization is preferably from 0 to 100° C., more preferably from 10 to 80° C. The polymerization pressure is preferably from 0.01 to 20 MPaG, more preferably from 0.3 to 10 MPaG, most preferably from 0.3 to 5 MPaG.

Further, for the emulsion-polymerization, a system such as a batch-, semi-batch- or continuous system may be used, but the semi-batch-system of adding the monomer continuously is preferred because an obtainable fluororesin has an uniform composition. The concentration of the obtainable fluororesin in the aqueous emulsion is preferably from 1 to 50 mass %, more preferably from 5 to 40 mass %.

By adding a coagulating agent to the aqueous emulsion of the fluororesin obtainable by the production method of the present invention, it is possible to coagulate the fluororesin. Further, it is possible to coagulate it by freezing the fluororesin aqueous emulsion.

As the coagulating agent, it is possible to use one usually used for coagulation of an aqueous emulsion of a fluororesin wherein an emulsifier such as APFO is used. For example, a water-soluble salt such as calcium chloride, magnesium chloride, aluminum chloride or aluminum nitrate, an acid such as nitric acid, hydrochloric acid or sulfuric acid, a water-soluble organic liquid such as an alcohol or acetone, may be mentioned. The amount of the coagulating agent to be added is preferably from 0.001 to 20 parts by mass, particularly preferably from 0.01 to 10 parts by mass, based on 100 parts by mass of the fluororesin aqueous emulsion. The concentration of the fluororesin in the aqueous emulsion used for the coagulation, is preferably from 1 to 50 mass %, more preferably from 5 to 40 mass %.

The coagulated fluororesin is preferably collected by filtration and washed with washing water. As the washing water, deionized water, pure water or ultrapure water may, for example, be mentioned. The amount of the washing water is preferably from 1 to 10 times the mass of the fluororesin. Even with such a small amount like this, it is possible to sufficiently reduce the fluorinated emulsifier of the above formula (1) adhered to the fluororesin, by washing once. The number of times of washing is preferably small from the viewpoint of workability, and it is preferably at most 5 times, more preferably from 1 to 3 times. The washing temperature is usually preferably from 10 to 40° C.

After coagulation of the fluororesin aqueous emulsion obtained by the production method of the present invention, the fluorinated emulsifier of the above formula (1) contained in the waste liquid, is recovered and recycled by a known method. The recovering method may, for example, be a method of using a strongly basic anion-exchange resin or a weakly basic anion-exchange resin for its adsorption, a method of using a synthetic adsorbent for its adsorption, a method of using an activated carbon for its adsorption, a method of using a layered double hydroxide for its occlusion or a method of concentrating the wastewater. Further, the fluorinated emulsifier recovered by the above method, may be regenerated by a known method.

The melt-processable fluororesin may, for example, be a tetrafluoroethylene/hexafluoropropylene copolymer (hereinafter referred to also as FEP), a tetrafluoroethylene/perfluoro (propyl vinyl ether) copolymer (hereinafter referred to also as PFA), a tetrafluoroethylene/ethylene copolymer (hereinafter referred to also as ETFE), a polyvinylidene fluoride (hereinafter referred to also as PVDF), a chlorotrifluoroethylene/ ethylene copolymer (hereinafter referred to also as ECTFE), a tetrafluoroethylene/hexafluoropropylene/vinylidene fluoride copolymer (hereinafter referred to also as THV), a tetrafluoroethylene/hexafluoropropylene/ethylene copolymer (hereinafter referred to also as EFEP), a tetrafluoroethylene/ hexafluoropropylene/perfluoro(alkyl vinyl ether) copolymer (hereinafter referred to also as EPA), a polyvinylidene fluoride (hereinafter referred to also as PVDF) or a chlorotrifluoroethylene/ethylene copolymer (hereinafter referred to also as ECTFE).

In the composition of FEP, the molar ratio of tetrafluoroethylene/hexafluoropropylene is preferably from 97/3 to 80/20, more preferably from 95/5 to 90/10. In the composition of PFA, the molar ratio of tetrafluoroethylene/perfluoro (propyl vinyl ether) is preferably from 99.9/0.1 to 95/5, more preferably from 99.7/0.3 to 97/3. In the composition of ETFE, the molar ratio of tetrafluoroethylene/ethylene is preferably from 70/30 to 40/60, more preferably from 65/35 to 50/50. In the composition of THV, the molar ratio of tetrafluoroethylene/hexafluoropropylene/vinylidene fluoride is preferably 25 to 85/5 to 15/10 to 60, more preferably 35 to 75/5 to 15/20 to 50.

In the composition of EFEP, the molar ratio of tetrafluoroethylene/hexafluoropropylene/ethylene is preferably 20 to 75/5 to 20/20 to 60, more preferably 35 to 65/5 to 15/30 to 50. In the composition of EPA, the molar ratio of tetrafluoroethylene/hexafluoropropylene/perfluoro(alkyl vinyl ether) is preferably 82 to 96.9/3 to 15/0.1 to 3, more preferably 88 to 94.8/5 to 10/0.2 to 2. In the composition of ECTFE, the molar ratio of chlorotrifluoroethylene/ethylene is preferably from 70/30 to 40/60, more preferably from 65/35 to 50/50.

As an index for the molecular weight of the melt-processable fluororesin, MFR (melt flow rate) is generally used. The smaller the MFR, the larger the molecular weight. The temperature for measuring MFR may be a temperature of at least the melting point and at most the decomposition point, but depending upon types of the fluororesins, fixed temperatures are usually used. For example, 372° C. is usually used for PFA, FEP and EPA, 297° C. for ETFE and ECTFE, 265° C. for THV, 230° C. for EFEP, and 235° C. for PVDF. MFR is preferably in a range of from 0.1 to 100 g/min, more preferably from 0.5 to 50 g/min, most preferably from 1 to 30 g/min.

The tensile strength of the melt-processable fluororesin at room temperature is at least 10 MPa, preferably at least 15 MPa, most preferably 20 MPa. The tensile elongation at room temperature is at least 100%, preferably at least 150%, most preferably at least 200%.

EXAMPLES

Now, the present invention will be described in further detail with reference to Examples. However, it should be understood that the present invention is by no means limited to such specific Examples.

Evaluation methods for the respective items are as follows.

Analysis for Composition of PFA

A film having a thickness of 30 µm formed by press molding PFA, was used. The content (mass %) of the polymerized units based on the perfluoro(propyl vinyl ether) in PFA was determined as a value obtained by dividing the absorption of light at 993 cm$^{-1}$ by the absorption of light at 2350 cm$^{-1}$, measured by an infrared spectrometry, and multiplying 0.95.

Analysis for Composition of FEP

A film having a thickness of 30 µm formed by press molding FEP, was used. The content (mass %) of the polymerized units based on the hexafluoropropylene in FEP was determined as a value obtained by dividing the absorption of light at 980 cm$^{-1}$ by the absorption of light at 2350 cm$^{-1}$, measured by an infrared spectrometry, and multiplying 3.2.

Analysis for Composition of ETFE

The copolymer composition of ETFE was determined by $^{19}$F melt NMR spectroscopy and an analysis of the fluorine content.

Measurement of MFR (Unit: g/min)

In accordance with ASTM D2116, MFR (also called melt flow rate) was measured by using Melt Indexer (manufactured by TAKARA KOGYO CO.). In cases of PFA and FEP, MFR was measured at 372° C. under a load of 5 kg. In the case of ETFE, it was measured at 297° C. under a load of 5 kg. In the case of PVDF, it was measured at 235° C. under a load of 5 kg.

Reference Example 1

Production Example of CF$_3$CF$_2$OCF(CF$_3$)CF$_2$OCF(CF$_3$)COONH$_4$ 2.58 g of CsF and 13.06 g of tetraglyme were charged into a hastelloy C autoclave having a capacity of 200 mL, followed by degassing, and then, 20.83 g of CF$_3$COF was introduced. Then, the autoclave was cooled to −20° C., and under a hermetically sealed and stirred condition, 57.5 g of hexafluoropropene oxide was introduced over a period of about one hour. The initial pressure showed 0.6 MPa. The reaction was continued for about one hour until the pressure no longer decreased, and then, the autoclave was returned to room temperature to obtain 78.57 g of a reaction crude liquid. This liquid was subjected to a GC analysis, whereby it was found that in addition to 49.7% of CF$_3$CF$_2$OCF(CF$_3$)CF$_2$OCF(CF$_3$)COF as the objective product, 19.1% of CF$_3$CF$_2$OCF(CF$_3$)COF and 12.8% of CF$_3$CF$_2$O(CF(CF$_3$)CF$_2$O)$_2$CF(CF$_3$)COF, were contained.

The same reaction was carried out by using 32.26 g of CF$_3$COF. Distillation and purification were carried out by combining 2 batches of the reaction crude liquid containing the obtained objective product. By using a 30 cm distillation column provided with a reflux condenser and packed with Helipack No. 1, 52.47 g of the objective product having a boiling point of 71° C./400 torr, was obtained. The objective product was charged in a reactor made of PTFE, and 2.32 g of water was drop-wise added with stirring to carry out hydrolysis. Then, HF was removed by nitrogen bubbling to obtain 50.45 g of a crude liquid of CF$_3$CF$_2$OCF(CF$_3$)CF$_2$OCF(CF$_3$)COOH. The crude liquid was subjected to simple distillation by a simple distillation apparatus made of glass to obtain 40 g of CF$_3$CF$_2$OCF(CF$_3$)CF$_2$OCF(CF$_3$)COOH.

Then, using 40 g of CF$_3$CF$_2$OCF(CF$_3$)CF$_2$OCF(CF$_3$)COOH, conversion to an ammonium salt was carried out. Namely, by using a reactor made of glass, 40 g of the above carboxylic acid was dissolved into 150 g of CClF$_2$CF$_2$CHClF, and then, 10.89 g of 28% ammonia water was drop-wise added thereto at room temperature to form the ammonium salt. After that, the solvent CClF$_2$CF$_2$CHClF was distilled off, followed by drying under reduced pressure to obtain 39.4 g of CF$_3$CF$_2$OCF(CF$_3$)CF$_2$OCF(CF$_3$)COONH$_4$ as a white solid.

Reference Example 2

Measurement of 1-Octanol/Water Partition Coefficient (LogPOW)

In accordance with OECD Test Guideline 117, 1-octanol/water partition coefficient (LogPOW) of a fluorinated emulsifier was measured by using HPLC (high performance liquid chromatography).

Conditions for the measurement were as follows: column: TOSOH ODS-120T column (φ 4.6 mm×250 mm), eluent: acetonitrile/0.6 mass % of HClO$_4$ aqueous solution=1/1 (vol/vol %), flow rate: 1.0 m/minute, sample amount: 300 μL, column temperature: 40° C., and detection light: UV 210 nm (WO2005-42593).

HPLC was carried out on standard substances (heptanoic acid, octanoic acid, nonanoic acid and decanoic acid) having known 1-octanol/water partition coefficients, and a calibration curve was prepared from the respective elution times and octanol/water partition coefficients of the respective standard substances. Based on this calibration curve, a value of partition coefficient (LogPOW) between 1-octanol and water was calculated from the elution time by HPLC of the fluorinated emulsifier. The results are shown in Table 1.

EEA has a small LogPOW value as compared to ammonium perfluorooctanate (APFO), thus indicating that its bioaccumulation potential is low. On the other hand, CF$_3$CF$_2$OCF(CF$_3$)CF$_2$OCF(CF$_3$)COONH$_4$ which was synthesized in Reference Example 1, has a structure similar to EEA, but its LogPOW value is larger than APFO, of which bioaccumulation potential is worried about, thus indicating that its accumulation in a living organism is high.

Further, in general, in order to judge whether or not a chemical substance is apt to be accumulated in a living organism, a testing method for measurement of a partition coefficient (LogPOW) between 1-octanol and water, is stipulated. As the testing method, in addition to "Partition Coefficient (1-octanol/water) Shake Flask Method" as stipulated in OECD test guideline 107 and in Japanese Industrial Standards Z 7260-107 (2000), a HPLC method (high-performance liquid chromatography) as stipulated and published in OECD Test Guideline 117, is used. A compound having a large partition coefficient value has a large tendency for bioaccumulation, and a compound having a small value means a small tendency for bioaccumulation. In a case where the LogPOW value is less than 3.5, it is considered proper to judge that it is not a high-concentration, and bioaccumulation is also considered to be small.

TABLE 1

| Fluorinated emulsifier | LogPOW |
| --- | --- |
| CF$_3$CF$_2$OCF$_2$CF$_2$OCF$_2$COONH$_4$ | 3.13 |
| CF$_3$(CF$_2$)$_6$COONH$_4$ | 3.67 |
| CF$_3$CF$_2$OCF(CF$_3$)CF$_2$OCF(CF$_3$)COONH$_4$ | 4.03 |

Example 1

Production of PFA

A 1.3 L polymerization reactor equipped with a stirrer was degassed, and into the reactor, 600 g of deionized water having 3 g of EEA dissolved therein, 1.0 g of methanol, 35 g of CF$_2$=CFOCF$_2$CF$_2$CF$_3$ (perfluoro(propyl vinyl ether), hereinafter referred to as PPVE) and 0.1 g of ammonium persulfate (hereinafter referred to as APS) were charged, followed by stirring at a rotational speed of 300 rpm. Inside of the polymerization reactor was raised to 65° C., and tetrafluoroethylene (hereinafter referred to as TFE) was charged. The pressure inside the polymerization reactor was adjusted to be 1.0 MPa, and polymerization was started. TFE was continuously charged in order to have the pressure to be constant throughout the polymerization, and when the amount of TFE continuously added reached 200 g, inside of the polymerization reactor was cooled to room temperature and unreacted TFE was purged. The polymerization reactor was opened, and an obtained aqueous emulsion was frozen and broken to precipitate a copolymer, followed by washing 3 times with 1000 ml of deionized water (25° C.). Then, it was dried at 150° C. for 12 hours to obtain 205 g of a TFE/PPVE copolymer. The obtained copolymer had a melting point of 305° C., a MFR of 15 g/min and a content of polymerized units based on PPVE in the copolymer being 3.9 mass % (1.47 mol %), and it was a melt-processable fluororesin. It was pressed at 340° C. to obtain a colorless white sheet. A micro dumbbell was punched out from the sheet having a thickness of 1.5 mm, and a tensile test was carried out. The tensile strength was 28 MPa, and the tensile elongation was 400%.

Example 2

Production of FEP

The same polymerization reactor as in Example 1 was degassed, and into the reactor, 600 g of deionized water having 3 g of EEA dissolved therein, 200 g of hexafluoropropylene (hereinafter referred to as HFP), and 0.3 g of APS were charged, followed by stirring at a rotational speed of 300 rpm. Inside of the polymerization reactor was raised to 65° C., and TFE was charged. The pressure inside the polymerization reactor was adjusted to be 1.5 MPa, and polymerization was started. TFE was continuously charged in order to have the pressure to be constant throughout the polymerization, and when the amount of TFE continuously added reached 150 g, inside of the polymerization reactor was cooled to room temperature and unreacted monomers were purged. The polymerization reactor was opened, and an obtained aqueous emulsion was frozen and broken to precipitate a copolymer, followed by washing 3 times with 1000 ml of deionized water (25° C.). Then, it was dried at 150° C. for 12 hours to obtain 160 g of a TFE/HFP copolymer. The obtained copolymer had a melting point of 261° C., a MFR of 17 g/min and a content of polymer units based on HFP in the copolymer being 11.8 mass % (7.9 mol %), and it was a melt-processable fluororesin. It was pressed at 340° C. to obtain a colorless white sheet. A micro dumbbell was punched out from the sheet having a thickness of 1.5 mm, and a tensile test was carried out. The tensile strength was 25 MPa, and the tensile elongation was 380%.

Example 3

Production of ETFE

The same polymerization reactor as in Example 1 was degassed, and into the reactor, 600 g of deionized water having 6 g of EEA dissolved therein, 60 g of tertiary butanol, 2.4 g of (perfluorobutyl)ethylene (hereinafter referred to as PFBE) and 0.15 g of APS were charged, followed by stirring at a rotational speed of 300 rpm. 111 g of TFE and 8 g of ethylene (hereinafter referred to as E) were charged, and inside of the polymerization reactor was raised to 65° C. to start polymerization. The polymerization pressure was 2.9 MPa. A mixed monomer having a molar ratio of TFE/E=53/47, was continuously charged in order to have the pressure to be constant throughout the polymerization, and every time when 10 g of the mixed monomer was charged, 0.3 g of PFBE was charged. When the amount of the mixed monomer continuously added reached 270 g, inside of the polymerization reactor was cooled to room temperature and unreacted monomers were purged. The polymerization reactor was opened, and an obtained aqueous emulsion was frozen and broken to precipitate a copolymer, followed by washing 3 times with 1000 ml of deionized water (25° C.). Then, it was dried at 150° C. for 12 hours to obtain 285 g of a TFE/E copolymer. The obtained copolymer had a melting point of 262° C., a MFR of 8 g/min and a molar ratio of polymerization units based on TFE/polymerization units based on E/polymerization units based on PFBE in the copolymer being 52.5/46.7/0.8, and it was a melt-processable fluororesin. It was pressed at 300° C. to obtain a colorless white sheet. A micro dumbbell was punched out from the sheet having a thickness of 1.5 mm, and a tensile test was carried out. The tensile strength was 32 MPa, and the tensile elongation was 320%.

Example 4

Production of PVDF

The same polymerization reactor as in Example 1 was degassed, and into the reactor, 600 g of deionized water having 3 g of EEA dissolved therein, 1.2 g of acetone, 0.3 g of APS and 40 g of vinylidene fluoride (hereinafter referred to as VDF) were charged, followed by stirring at a rotational speed of 300 rpm. Inside of the polymerization reactor was raised to 65° C., and polymerization was started. The polymerization pressure was 2.0 MPa. VDF was continuously charged in order to have the pressure to be constant throughout the polymerization, and when the amount of VDF continuously added reached 180 g, inside of the polymerization reactor was cooled to room temperature and unreacted monomers were purged. The polymerization reactor was opened, and an obtained aqueous emulsion was frozen and broken to precipitate a copolymer, followed by washing 3 times with 1000 ml of deionized water (25° C.). Then, it was dried at 150° C. for 12 hours to obtain 170 g of PVDF. PVDF had a melting point of 166° C., a MFR of 3.2 g/min, and it was a melt-processable fluororesin.

It was pressed at 300° C. to obtain a colorless white sheet. A micro dumbbell was punched out from the sheet having a thickness of 1.5 mm, and a tensile test was carried out. The tensile strength was 45 MPa, and the tensile elongation was 340%.

INDUSTRIAL APPLICABILITY

The melt-processable fluororesin obtained by the production method of the present invention, may be used for various applications in the same manner as the conventional fluororesins. The specific examples may, for example, be extruded products such as wire coverings, wire jackets, tubes for chemical solutions or pure water, copy roll covers, fuel hoses, agricultural or structural materials or release films, injection-molded products such as bulbs, pump housings, automobile components, copy machine components or semiconductor production device components, or powder-molded products such as tank linings.

The entire disclosure of Japanese Patent Application No. 2005-305659 filed on Oct. 20, 2005 including specification, claims and summary is incorporated herein by reference in its entirety.

What is claimed is:

1. A method for producing a melt-processable fluororesin, wherein said method comprises emulsion-polymerization of a fluorinated monomer in an aqueous medium comprising a fluorinated emulsifier according to the formula $$CF_3CF_2OCF_2CF_2OCF_2COONH_4.$$

2. The method for producing a melt-processable fluororesin according to claim 1, wherein the fluorinated monomer is at least one fluorinated monomer selected from the group consisting of tetrafluoroethylene, vinylidene fluoride, hexafluoropropylene, a perfluoro(alkyl vinyl ether) of $CF_2=CFOR_f$ wherein $R_f$ is a $C_{1-16}$ perfluoroalykyl group which may comprise an etheric oxygen atom, chlorotrifluoroethylene, a polyfluoroalkyl ethylene, perfluoro(2,2-dimethyl-1,3-dioxole), a perfluoro(4-alkyl-1,3-dioxole) and $CF_2=CFO(CF_2)_nCF=CF_2$ wherein n is 1 or 2.

3. The method for producing a melt-processable fluororesin according to claim 1, wherein the melt-processable fluororesin is a copolymer of ethylene and at least one fluorinated monomer selected from the group consisting of tetrafluoroethylene, vinylidene fluoride, hexafluoropropylene and chlorotrifluoroethylene.

4. The method for producing a melt-processable fluororesin according to claim 1, wherein the melt-processable fluororesin is a copolymer selected from the group consisting of a tetrafluoroethylene/perfluoro(alkyl vinyl ether) copolymer, a tetrafluoroethylene/hexafluoropropylene copolymer, a tetrafluoroethylene/ethylene copolymer, a tetrafluoroethylene/hexafluoropropylene/vinylidene fluoride copolymer, a tetrafluoroethylene/hexafluoropropylene/ethylene copolymer, a tetrafluoroethylene/hexafluoropropylene/perfluoro (alkyl vinyl ether) copolymer, a polyvinylidene fluoride and a chlorotrifluoroethylene/ethylene copolymer.

5. The method for producing the melt-processable fluororesin according to claim 1, wherein the content of the fluorinated emulsifier is 0.01-10 wt. %, based on the total weight of the aqueous medium.

* * * * *